United States Patent
Kannan et al.

(10) Patent No.: US 11,908,161 B2
(45) Date of Patent: Feb. 20, 2024

(54) METHOD AND ELECTRONIC DEVICE FOR GENERATING AR CONTENT BASED ON INTENT AND INTERACTION OF MULTIPLE-OBJECTS

(71) Applicant: Samsung Electronics Co., Ltd., Suwon-si (KR)

(72) Inventors: Ramasamy Kannan, Bangalore (IN); Lokesh Rayasandra Boregowda, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 38 days.

(21) Appl. No.: 17/544,439

(22) Filed: Dec. 7, 2021

(65) Prior Publication Data
US 2022/0114751 A1 Apr. 14, 2022

Related U.S. Application Data

(63) Continuation of application No. PCT/KR2021/013871, filed on Oct. 8, 2021.

(30) Foreign Application Priority Data

Oct. 8, 2020 (IN) .............................. 202041043804
Jul. 8, 2021 (IN) .............................. 2020 41043804

(51) Int. Cl.
*G06T 7/73* (2017.01)
*G06V 20/20* (2022.01)
(Continued)

(52) U.S. Cl.
CPC ................ *G06T 7/74* (2017.01); *G06T 7/248* (2017.01); *G06T 11/00* (2013.01); *G06V 10/764* (2022.01);
(Continued)

(58) Field of Classification Search
None
See application file for complete search history.

(56) References Cited

U.S. PATENT DOCUMENTS 9,330,499 B2   5/2016  Perez et al.
9,503,786 B2   11/2016 El Kaliouby et al.
(Continued)

OTHER PUBLICATIONS

An International Search Report dated Jan. 19, 2022, issued in an International Application No. PCT/KR2021/013871.
(Continued)

*Primary Examiner* — Edward Martello
(74) *Attorney, Agent, or Firm* — Jefferson IP Law, LLP

(57) ABSTRACT

An electronic device and a method for generating an augmented reality (AR) content in an electronic device are provided. The method includes determining a posture and an action of each object of the plurality of the objects in the scene displayed on a field of view of the electronic device, classifying the posture and the action of each object of the plurality of the objects in the scene, identifying an intent and an interaction of each object from the plurality of objects in the scene based on at least one of the classified posture and the classified action, and generating the AR content for the at least one object in the scene of at least one of the identified intent and the identified interaction of the at least one object.

20 Claims, 11 Drawing Sheets

(51) Int. Cl.
*G06V 10/764* (2022.01)
*G06T 7/246* (2017.01)
*G06V 40/20* (2022.01)
*G06T 11/00* (2006.01)

(52) U.S. Cl.
CPC .............. *G06V 20/20* (2022.01); *G06V 40/23* (2022.01); *G06T 2207/10016* (2013.01); *G06T 2207/20081* (2013.01); *G06T 2207/30196* (2013.01)

(56) References Cited

U.S. PATENT DOCUMENTS

| | | | |
|---|---|---|---|
| 9,524,282 B2 | 12/2016 | Algreatly | |
| 9,990,028 B2 | 6/2018 | Basra | |
| 10,325,410 B1 | 6/2019 | Smith et al. | |
| 10,434,396 B2 | 10/2019 | Divine | |
| 10,531,137 B1 | 1/2020 | Matak et al. | |
| 10,768,769 B2 | 9/2020 | Choe et al. | |
| 2010/0303289 A1* | 12/2010 | Polzin | G06V 40/103 348/135 |
| 2012/0154557 A1* | 6/2012 | Perez | G06F 3/017 348/E13.001 |
| 2017/0091975 A1 | 3/2017 | Zises | |
| 2017/0201808 A1 | 7/2017 | Chowdhary et al. | |
| 2019/0356964 A1 | 11/2019 | Tillman, Jr. | |
| 2019/0392650 A1 | 12/2019 | Holzer et al. | |

OTHER PUBLICATIONS

Mengshi Qi et al., Sports video captioning via attentive motion representation and group relationship modeling; IEEE Transactions on Circuits and Systems for Video Technology, vol. 30, Issue 8, Aug. 31, 2020.
FaceUnity SDK—Gesture Recognition—Trigger AR stickers with your gesture, https://www.youtube.com/watch?v=Z9BPYegWu8M (all time).
HoloLens 2 AR Headset: On Stage Live Demonstration, https://www.youtube.com/watch?v=uIHPPtPBgHk (3:40~5:00).
Mengshi Qi et al., Sports Video Captioning via Attentive Motion Representation and Group Relationship Modeling, IEEE Transactions on Circuits and Systems for Video Technology, Jul. 6, 2019.
Indian Office Action dated May 10, 2022, issued in Indian Application No. 202041043804.
European Search Report dated Nov. 3, 2023, issued in European Application No. 21878050.0.

* cited by examiner

METHOD AND ELECTRONIC DEVICE FOR GENERATING AR CONTENT BASED ON INTENT AND INTERACTION OF MULTIPLE-OBJECTS

CROSS-REFERENCE TO RELATED APPLICATION(S)

The application is a continuation application, claiming priority under § 365(c), of an International application No. PCT/KR2021/013871, filed on Oct. 8, 2021, which is based on and claims the benefit of an Indian Provisional patent application number 202041043804, filed on Oct. 8, 2020, in the Indian Intellectual Property Office, and of an Indian Complete patent application number 202041043804, filed on Jul. 8, 2021, in the Indian Intellectual Property Office, the disclosure of each of which is incorporated by reference herein in its entirety.

FIELD OF INVENTION

The disclosure relates to an electronic device. More particularly, the disclosure relates to a method and electronic device for generating augmented reality (AR) content based on an intent and an interaction of multiple-objects.

BACKGROUND

In general, AR is a technology that overlays/superimposes a computer-generated image on top of a user's view of a real-world environment, resulting in an "augmented" view of the captured real-world environment. Typically, the computer-generated image/data is built on the real-world environment that has been captured. The AR is used in various scenarios including televised athletic competitions. For example, in a football game, a broadcaster can overlay an image of a line representing a first down on a view of a football field. Another example is video capturing of an object using an electronic camera device, which may offer more detail about the object overlaid on the video. Because of the increasing popularity of electronic device(s), a wide range of AR applications have emerged, which provides modern users a variety of enriched experiences.

FIG. 1 illustrates an AR content being triggered according to the related art.

Referring to FIG. 1, in order to insert an AR content (e.g. AR text, AR effects, or the like), existing methods/electronic device(s) require to predict body gestures and actions of a single human being in a scene. 1. The AR text and/or AR effects are enabled by the single human gesture (1) (e.g. any kind of input from the single human, facial expressions of the single human, or the like) and/or reliant on body posture monitoring (2) of the single human in the scene. For example, various Two-dimensional (2D) and stereoscopic Three-dimensional (3D) dynamic stickers ranging from adorable to funny models, such as kittens, bunny ears, and vivacious maids, can be activated by facial expressions and can provide new motivation for selfies, live streaming, and short videos. In another example, users can receive face paintings and animal masks after 3D models based on facial expressions are developed. Masks suit so perfectly for facial expressions that it's as though they were drawn over people's faces.

However, the existing methods/electronic device(s) do not consider multi-object interactions and intents to insert the AR text and the AR effects accurately in the real-world environment. Thus, it is desired to provide a useful alternative for inserting/generating the AR content in the electronic device(s).

The above information is presented as background information only to assist with an understanding of the disclosure. No determination has been made, and no assertion is made, as to whether any of the above might be applicable as prior art with regard to the disclosure.

OBJECT OF DISCLOSURE

Aspects of the disclosure are to address at least the above-mentioned problems and/or disadvantages and to provide at least the advantages described below. Accordingly, an aspect of the disclosure is to provide a method and an electronic device for generating/inserting AR content in the electronic device by identifying interactions and intents in a multi-object environment and aggregating the interactions and the intents of the multi-object environment over a period of time. The generated/inserted AR content is displayed automatically on a screen of the electronic device, providing a richer user experience.

Another aspect of the disclosure is to provide the interactions and the intents of the multi-object/plurality of the objects (e.g. interacting and non-interacting objects) by classifying a posture of each object of the plurality of the objects and an action of each object of the plurality of the objects in a scene displayed on a field of view of the electronic device.

Another aspect of the disclosure is to aggregate the identified intents and interactions over a pre-defined time using a Machine Learning (ML) model. The aggregated intents and the interactions are then mapped to a predefined template(s) of the AR text and/or the AR effect. Information to be inserted in the template(s) of the AR text and/or the AR effect are obtained from a knowledge base that is updated with real-time information about the scene, the template(s) is enabled in a video/preview/image, providing a richer user experience.

Additional aspects will be set forth in part in the description which follows and, in part, will be apparent from the description, or may be learned by practice of the presented embodiments.

SUMMARY

In accordance with an aspect of the disclosure, a method for generating AR content in an electronic device is provided. The method includes identifying, by the electronic device, a plurality of objects in a scene displayed on a field of view of the electronic device. Further, the method includes determining, by the electronic device, one of a posture of each object of the plurality of the objects in the scene and an action of each object of the plurality of the objects in the scene. Further, the method includes classifying, by the electronic device, the posture of each object of the plurality of the objects in the scene and the action of each object of the plurality of the objects in the scene. Further, the method includes identifying, by the electronic device, an intent of each object from the plurality of objects in the scene based on the classified posture and the classified action. Further, the method includes identifying, by the electronic device, an interaction of the each object from the plurality of objects in the scene. Further, the method includes generating, by the electronic device, the AR content for an object from the plurality of objects in the scene based on the identified intent and the identified interaction of the object.

In an embodiment of the disclosure, the method further includes classifying, by the electronic device, each object of the plurality of the objects in order to determine the posture, the action, the interaction and the intent associated with each object of the plurality of the objects in the scene. Further, the method includes determining, by the electronic device, the location information and 3-D and/or 2-D distance information between each object of the plurality of the objects by generating a semantic Three-dimensional (3D) map and/or a semantic Two-dimensional (2D) map of the identified plurality of objects in the scene displayed on the field of view of the electronic device. Further, the method includes determining, by the electronic device, location information of each object of the plurality of the objects by using bounding boxes and distance information between each object of the plurality of the objects by using the semantic 3D map. Further, the method includes determining, by the electronic device, a linear motion of each object of the plurality of the objects and a rotational motion of each object of the plurality of the objects by using the generated semantic 3D map, the classified each object, the determined location information, the classified posture, and the classified action.

In an embodiment of the disclosure, where determining the posture of each object of the plurality of the objects in the scene includes detecting, by the electronic device, multiple body key-points associated with an interacting human of the plurality of the objects and non-interacting humans of the plurality of the objects in the scene displayed on the field of view of the electronic device. Further, the method includes estimating, by the electronic device, the posture of each object of the plurality of the objects based on features derived from the detected multiple body key-points to classify the posture of each object of the plurality of the objects in the scene.

In an embodiment of the disclosure, where determining the action of each object of the plurality of the objects in the scene includes determining classifying, by the electronic device, the action of each object of the plurality of the objects based on the classified postures and multiple body key-points identified over a current frame and multiple past frames.

In an embodiment of the disclosure, where classifying the posture of each object of the plurality of the objects in the scene includes detecting, by the electronic device, pose coordinates of the identified plurality of objects in the scene. Further, the method includes obtaining, by the electronic device, pose features from the detected pose coordinates. Further, the method includes time interleaving, by the electronic device, pose features obtained from multiple objects in a single camera frame, and providing each object pose feature as input to a simultaneous real-time classification model, one after the other, to predict the posture of all objects in the single camera frame before the next camera frame arrives. Further, the method includes applying, by the electronic device, the simultaneous real-time classification model to predict the posture of each object in each frame of the scene.

In an embodiment of the disclosure, where classifying the action of each object of the plurality of the objects in the scene includes detecting, by the electronic device, sequence of an image frame, where the image frame comprises the identified plurality of objects in the scene and where each object of the plurality of objects performing the action. Further, the method includes converting, by the electronic device, the detected sequence of image frame having actions of a first object of the plurality of objects into a sequence of pose coordinates denoting the action of the first object of the plurality of objects. Further, the method includes converting, by the electronic device, the detected sequence of frames having actions of a second object of the plurality of objects into the sequence of pose coordinates denoting the action of the second object of the plurality of objects. Further, the method includes time interleaving, by the electronic device, the pose features and classified postures, obtained from the multiple objects over current multiple camera frames, and providing each object pose features and classified postures as input to a simultaneous real-time classification model, one after the other, to predict the action of all objects in the current multiple camera frames before the next camera frame arrives. Further, the method includes applying, by the electronic device, the simultaneous real-time classification model to predict the action of each object in each frame of the scene.

In an embodiment of the disclosure, where identifying the intent and the interaction of each object of the plurality of objects in the scene includes calculating, by the electronic device, probability between each object of the plurality of the objects in the scene based on the classified posture and the classified action. Further, the method includes identifying, by the electronic device, the intent and the interaction of each object of the plurality of objects based on the calculated probability, the determined linear motion, and the determined rotational motion.

In an embodiment of the disclosure, the intent and the interaction of each object of the plurality of objects identified by using a plurality of features, and where the plurality of features comprises an object Identity (ID), object function, object shape, object pose coordinates, object postures, object actions, object linear motion coordinates, object rotational motion coordinates, object past interaction states, and object past intent states.

In an embodiment of the disclosure, where generating the AR content for the object in the scene based on the identified intent and the identified interaction of the object includes aggregating, by the electronic device, the identified intent and the identified interaction of the object from the plurality of objects in the scene over a pre-defined time using a Machine Learning (ML) model. Further, the method includes mapping, by the electronic device, the aggregated intent and the aggregated interaction with a predefined template of one of an AR text templates and an AR effect templates. Further, the method includes automatically inserting, by the electronic device, real-time information in the predefined template and displaying the predefined template with the one of the AR text templates and the AR effect templates in the scene displayed on the field of view of the electronic device.

In an embodiment of the disclosure, inserting real-time information in the AR text template and the AR effect template uses the real-time information from a knowledge base.

In accordance with another aspect of the disclosure, an electronic device for generating the AR content in the electronic device is provided. The electronic device includes an AR content controller coupled with a processor and a memory. The AR content controller is configured to identify the plurality of objects in the scene displayed on the field of view of the electronic device. Further, the AR content controller is configured to determine one of the posture of each object of the plurality of the objects in the scene and the action of each object of the plurality of the objects in the scene. Further, the AR content controller is configured to classify the posture of each object of the plurality of the objects in the scene and the action of each object of the plurality of the objects in the scene. Further, the AR content controller is configured to identify the intent of each object from the plurality of objects in the scene based on the classified posture and the classified action. Further, the AR content controller is configured to identify the interaction of the each object from the plurality of objects in the scene. Further, the AR content controller is configured to generate the AR content for the object in the scene based on the identified intent and the identified interaction of the object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
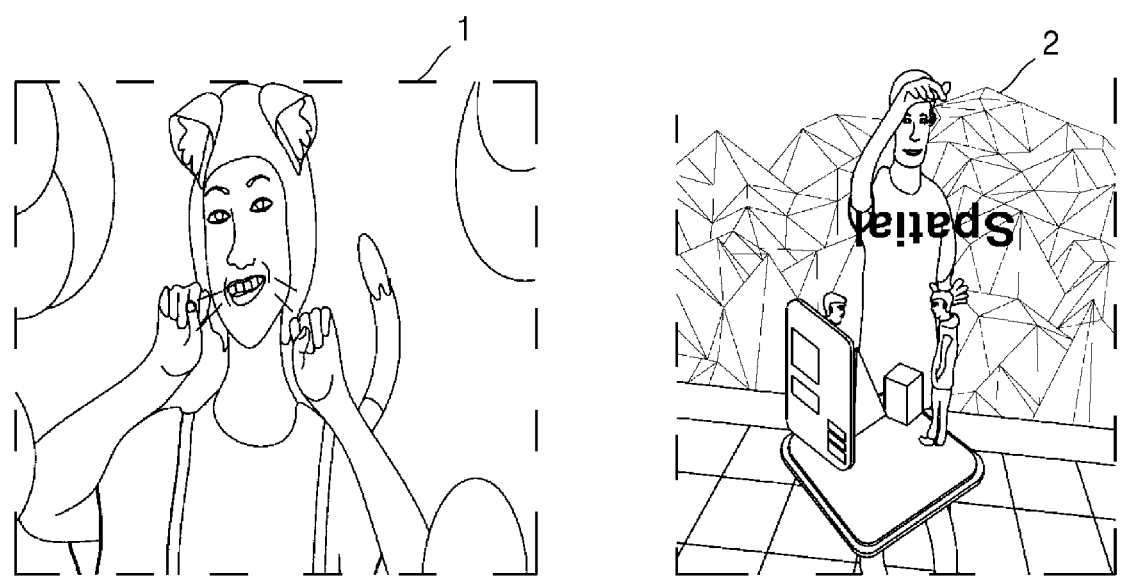
FIG. 1 illustrates an AR content being triggered according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. In addition, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Accordingly, the embodiment herein is to provide a method for generating AR content in an electronic device. The method includes identifying, by the electronic device, a plurality of objects in a scene displayed on a field of view of the electronic device. Further, the method includes determining, by the electronic device, one of a posture of each object of the plurality of the objects in the scene and an action of each object of the plurality of the objects in the scene. Further, the method includes classifying, by the electronic device, the posture of each object of the plurality of the objects in the scene and the action of each object of the plurality of the objects in the scene. Further, the method includes identifying, by the electronic device, an intent of each object from the plurality of objects in the scene based on the classified posture and the classified action. Further, the method includes identifying, by the electronic device, an interaction of the each object from the plurality of objects in the scene. Further, the method includes generating, by the electronic device, the AR content for an object from the plurality of objects in the scene based on the identified intent and the identified interaction of the object.

Accordingly, the embodiments herein provide the electronic device for generating the AR content in the electronic device. The electronic device includes an AR content controller coupled with a processor and a memory. The AR content controller is configured to identify the plurality of objects in the scene displayed on the field of view of the electronic device. Further, the AR content controller is configured to determine one of the posture of each object of the plurality of the objects in the scene and the action of each object of the plurality of the objects in the scene. Further, the AR content controller is configured to classify the posture of each object of the plurality of the objects in the scene and the action of each object of the plurality of the objects in the scene. Further, the AR content controller is configured to identify the intent of each object from the plurality of objects in the scene based on the classified posture and the classified action. Further, the AR content controller is configured to identify the interaction of the each object from the plurality of objects in the scene. Further, the AR content controller is configured to generate the AR content for the object in the scene based on the identified intent and the identified interaction of the object.

Unlike existing methods/electronic device(s) and systems, the proposed method allows the electronic device to generate/insert the AR content in the electronic device by identifying the interactions and intents in the multi-object environment and aggregating the interactions and the intents of the multi-object environment over the period of time. The generated/inserted AR content is automatically displayed on the screen of the electronic device which provides a richer user experience.

Unlike existing methods/electronic device(s) and systems, the proposed method allows the electronic device to predict the interactions and the intents of the multi-object/plurality of the objects (e.g. interacting and non-interacting objects) by classifying the posture of each object of the plurality of the objects and the action of each object of the plurality of the objects in the scene displayed on the field of view of the electronic device.

Unlike existing methods/electronic device(s) and systems, the proposed method allows the electronic device to aggregate the identified intents and interactions over the pre-defined time using the ML model. The aggregated intents and the interactions are then mapped to the pre-defined template(s) of the AR text and/or the AR effect. Information to be inserted in the template(s) of the AR text and/or the AR effect are obtained from the knowledge base that is updated with real-time information about the scene, the template(s) is enabled in the video/preview/image, providing a richer user experience.

Referring now to the drawings and more particularly to FIGS. 2 to 6, 7A to 7C, 8, 9A, and 9B, where similar reference characters denote corresponding features consistently throughout the figures, there are shown preferred embodiments.

Figure 2:
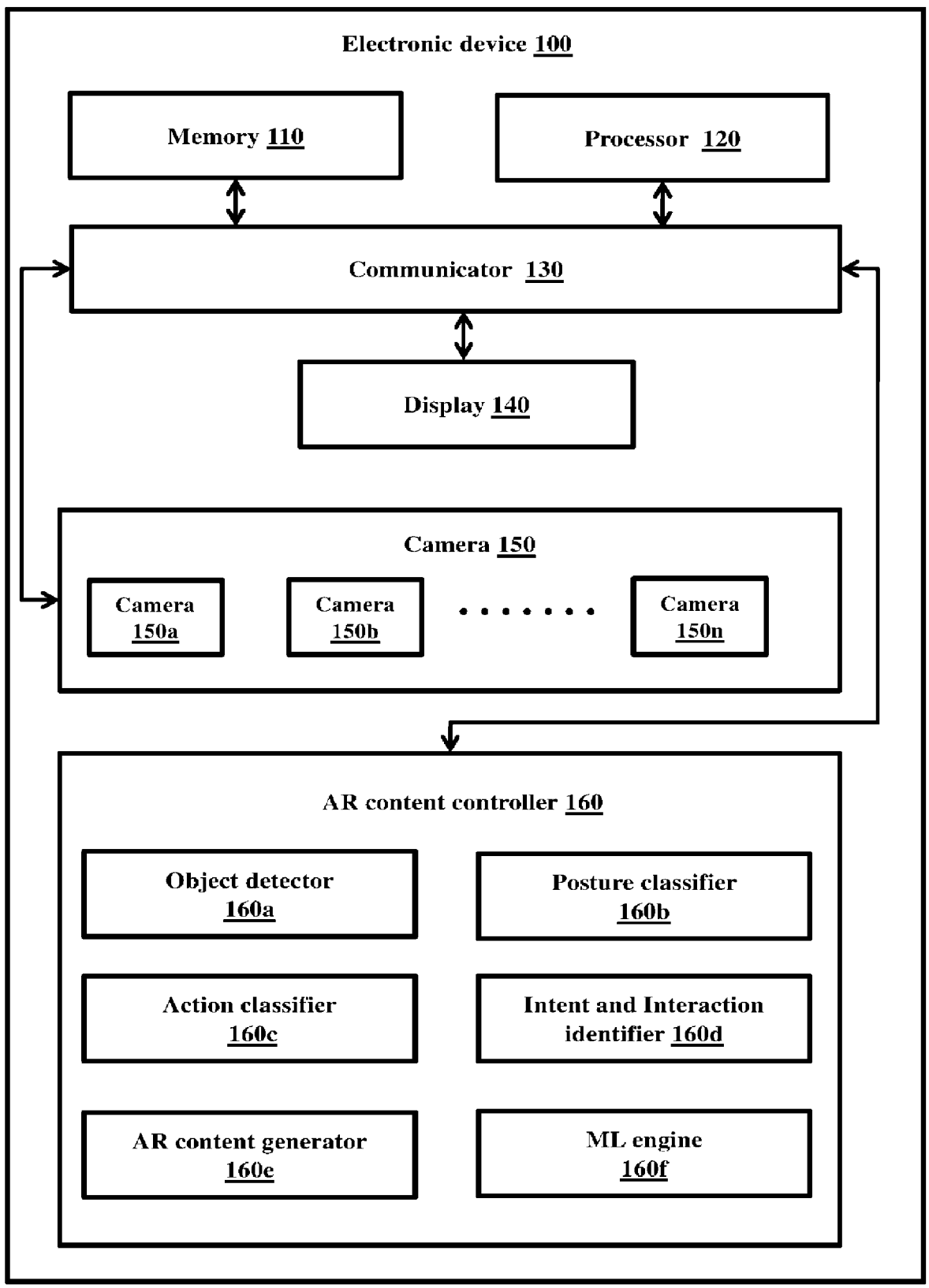
FIG. 2 illustrates a block diagram of an electronic device for generating an AR content by identifying interactions and intents in a multi-object environment according to an embodiment of the disclosure.

FIG. 2 illustrates a block diagram of an electronic device for generating an AR content by identifying interactions and intents in a multi-object environment according to an embodiment of the disclosure.

Referring to FIG. 2, the electronic device (100) may be, for example, but not limited to a smartphone, a laptop, an internet of things (IoT) device, a drone, an action camera, a sports camera or a like.

In an embodiment, the electronic device (100) includes a memory (110), a processor (120), a communicator (130), a display (140), a camera (150) and an AR content controller (160).

The memory (110) stores classified posture and classified action of each object of a plurality of the objects in a scene displayed on a field of view of the electronic device (100), an intent of each object from the plurality of objects in the scene, an interaction of each object from the plurality of objects in the scene, a semantic 3D map, location information of each object of the plurality of the objects, distance information between each object of the plurality of the objects, and predefined template of an AR text templates and an AR effect templates. Further, the memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

The processor (120) communicates with the memory (110), the communicator (130), the display (140), the camera (150), and the AR content controller (160). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit, such as a graphics processing unit (GPU), a visual processing unit (VPU), and/or an Artificial intelligence (AI) dedicated processor, such as a neural processing unit (NPU).

The communicator (130) includes an electronic circuit specific to a standard that enables wired or wireless communication. The communicator (130) is configured for communicating internally between internal hardware components and with external devices via one or more networks. The camera (150) includes a primary camera (150a) and at least one secondary camera (150b-150n).

In an embodiment, the AR content controller (160) is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor.

In an embodiment, the AR content controller (160) is configured to identify a plurality of objects in a scene displayed on a field of view of the electronic device (100). Further, the AR content controller (160) is configured to determine one of a posture of each object of the plurality of the objects in the scene and an action of each object of the plurality of the objects in the scene. Further, the AR content controller (160) is configured to classify the posture of each object of the plurality of the objects in the scene and the action of each object of the plurality of the objects in the scene. Further, the AR content controller (160) is configured to identify an intent of each object from the plurality of objects in the scene based on one of the classified posture and the classified action. Further, the AR content controller (160) is configured to identify an interaction of each object from the plurality of objects in the scene. Further, the AR content controller (160) is configured to generate the AR content for the one object in the scene based on the identified intent and the identified interaction of the object.

Further, the AR content controller (160) is configured to classify each object of the plurality of the objects in order to determine the posture, the action, the interaction and the intent associated with each object of the plurality of the objects in the scene. Further, the AR content controller (160) is configured to determine the location information and 3D and/or 2D distance information between each object of the plurality of the objects by generating a semantic Three-dimensional (3D) map and/or a semantic Two-dimensional (2D) map of the identified plurality of objects in the scene displayed on the field of view of the electronic device. The semantic 2D/3D maps are generated by 1) segmenting the scene based on the identified foreground objects and the background 2) localization (2D/3D coordinates to denote the location of the objects in the scene) of each object. Further, the AR content controller (160) is configured to determine a linear motion of each object of the plurality of the objects and a rotational motion of each object of the plurality of the objects by using the generated semantic 3D map, the classified each object, the determined location information, the classified posture, and the classified action. In semantic 2D maps, the location and relative position of objects are denoted by 2D coordinates. In semantic 3D maps, the location and relative position of objects are dented by 3D coordinates. I.e., the semantic 2D/3D maps provide the relative positions of the different objects in the scene using the 2D/3D coordinates. By tracking the changes in 2D/3D coordinates and object rotation in every camera frame, the linear motion and rotational motion of the objects can be computed and quantified.

Further, the AR content controller (160) is configured to detect multiple body key-points associated with an interacting human of the plurality of the objects and non-interacting humans of the plurality of the objects in the scene displayed on the field of view of the electronic device (100). The body key-points are predefined locations on a human body that are used to track the human pose. It consists of 2D/3D coordinates denoting the position of body joints (neck, shoulder, elbow, wrists, ankle, knees, hips and the like) and prominent landmark (head top, thorax, pelvis, eyes, and the like) on the human body. Further, the AR content controller (160) is configured to estimate the posture of each object of the plurality of the objects based on features derived from the detected multiple body key-points to classify the posture of each object of the plurality of the objects in the scene. In an embodiment, the postures and actions are predefined for any scene. For example, players in a basketball game will have predefined postures such as standing on ground posture, throwing posture, defending posture, bending down posture and the like. The predefined actions for a basketball game would be running, dribbling the ball, jumping in the air, picking up the ball and the like. For a birthday party scene, there will be predefined postures such as standing, sitting, blowing the cake. So there will be predefined postures stored in a database for each scene type.

Further, the AR content controller (160) is configured to classify the action of each object of the plurality of the objects based on the classified postures and multiple body key-points identified over a current frame and multiple past frames.

Further, the AR content controller (160) is configured to detect a pose coordinate of the identified plurality of objects in the scene. Further, the AR content controller (160) is configured to obtain a pose feature from the detected pose coordinate. Further, the AR content controller (160) is configured to perform time interleave pose features obtained from multiple objects in a single camera frame, and providing each object pose feature as input to a simultaneous real-time classification model, one after the other, to predict the posture of all objects in the single camera frame before next camera frame arrives. In general, each camera frame has multiple people in the frame. Each camera frame needs to be executed in 30 ms. For example, if 3 people are included in a frame, the posture and action of each person need to be classified using the pose features as input, within 10 ms each. The entire 30 ms will be subdivided into 3 sub-blocks of 10 ms each. Each person's pose coordinates is processed within the 10 ms available. This process of interleaving the different person pose coordinates as input to the common posture/action classification model to get individual person posture/action is known as time interleaving. Further, the AR content controller (160) is configured to apply the simultaneous real-time classification model to predict the posture of each object in each frame of the scene.

Further, the AR content controller (160) is configured to detect sequence of an image frame, where the image frame comprises the identified plurality of objects in the scene and where each object of the plurality of objects performing the action. Further, the AR content controller (160) is configured to convert the detected sequence of image frame having actions of a first object of the plurality of objects into a sequence of pose coordinates denoting the action of the first object of the plurality of objects. Further, the AR content controller (160) is configured to convert the detected sequence of frames having actions of a second object of the plurality of objects into the sequence of pose coordinates denoting the action of the second object of the plurality of objects. Further, the AR content controller (160) is configured to perform time interleave the pose features and classified postures, obtained from the multiple objects over current multiple camera frames, and providing each object pose features and classified postures as input to a simultaneous real-time classification model, one after the other, to predict the action of all objects in the current multiple camera frames before the next camera frame arrives. Further, the AR content controller (160) is configured to apply a simultaneous real-time classification model to predict the action of each object in each frame of the scene.

Further, the AR content controller (160) is configured to calculate probability of the intent and the interaction of each object of the plurality of the objects in the scene based on the classified posture and the classified action. Each camera scene has predefined interactions and intents that have been identified. For example, in a basketball game, different predefined interactions are, ball entering the backboard net, player running with ball, player throwing the ball, player 1 blocking player 2 and the like. The interaction/intent detection algorithms generate probabilities of the various predefined interactions/intents in the scene for each frame. When the interaction has the highest probability and the probability exceeds a predefined threshold, it is selected and identified. Further, the AR content controller (160) is configured to identify the intent and the interaction of each object of the plurality of objects based on the calculated probability, the determined linear motion, and the determined rotational motion. The intent and the interaction of each object of the plurality of objects identified by using a plurality of features, and where the plurality of features comprises an object identity (ID), object function, object shape, object pose coordinates, object postures, object actions, object linear motion coordinates, object rotational motion coordinates, object past interaction states, and object past intent states. With respect to the object ID, there are predefined objects based on the scene type (basketball game, birthday party and the like). The identity of the objects in the camera scene is identified using an object classification and localization ML/AI algorithm With respect to the object function, the object function is a predefined feature for the predefined objects in the scene. For example, Human-1, Human-2, Human-3 are different objects that have the same function in the basketball if the Human-1, Human-2, Human-3 are basketball players. The Human-4 as a referee has a different function in the basketball court.

Further, the AR content controller (160) is configured to aggregate the identified intent and the identified interaction of the object from the plurality of objects in the scene over a pre-defined time using a ML model (160f) (i.e., an ML engine). Further, the AR content controller (160) is configured to map the aggregated intent and the aggregated interaction with a predefined template of one of an AR text templates and an AR effect templates. Further, the AR content controller (160) is configured to automatically insert real-time information in the predefined template and displaying the predefined template with the one of the AR text templates and the AR effect templates in the scene displayed on the field of view of the electronic device (100). Inserting of the real-time information in the one of the AR text template and the AR effect template uses the real-time information from a knowledge base.

In an embodiment, the AR content controller (160) includes an object detector (160a), a posture classifier (160b), an action classifier (160c), an intent and interaction identifier (160d), an AR content generator (160e) and a ML engine (160f).

In an embodiment, the object detector (160a) identifies the plurality of objects in the scene displayed (i.e., a display (140)) on the field of view of the electronic device (100). Further, the object detector (160a) classifies each object of the plurality of the objects. Further, the object detector (160a) generates the semantic 2D map and/or 3D map of the identified plurality of objects in the scene displayed on the field of view of the electronic device (100). Further, the object detector (160a) determines the location information of each object of the plurality of the objects by using the bounding boxes and the distance information between each object of the plurality of the objects by using the semantic 2D map and/or 3D map. Further, the object detector (160a) determines the linear motion of each object of the plurality of the objects and the rotational motion of each object of the plurality of the objects by using the generated semantic 2D map and/or 3D map, the classified each object, the determined location information, the classified posture, and the classified action.

In an embodiment, the posture classifier (160b) determines the posture of each object of the plurality of the objects in the scene and classifies the posture of each object of the plurality of the objects in the scene. Further, the posture classifier (160b) detects multiple body key-points associated with an interacting human of the plurality of the objects and non-interacting humans of the plurality of the objects in the scene displayed on the field of view of the electronic device (100). Further, the posture classifier (160b) estimates the posture of each object of the plurality of the objects based on the detected multiple body key-points. Further, the posture classifier (160b) detects the pose coordinate of the identified plurality of objects in the scene. Further, the posture classifier (160b) obtains the pose feature from the detected pose coordinate. Further, the posture classifier (160b) performs time interleaving on the obtained pose feature and applies the simultaneous real-time classification model to predict the posture of each object in each frame of the scene.

In an embodiment, the action classifier (160c) determines the action of each object of the plurality of the objects in the scene and classifies the action of each object of the plurality of the objects in the scene. Further, the action classifier (160c) classifies next valid posture and overall action by using previous valid posture. Further, the action classifier (160c) detects sequence of the image frame, where the image frame comprises the identified plurality of objects in the scene and where each object of the plurality of objects performing the action. Further, the action classifier (160c) converts the detected sequence of image frame having actions of the first object of the plurality of objects into the sequence of pose coordinates denoting the action of the first object of the plurality of objects. Further, the action classifier (160c) converts the detected sequence of frames having actions of the second object of the plurality of objects into the sequence of pose coordinates denoting the action of the second object of the plurality of objects. Further, the action classifier (160c) performs time interleaving on the converted sequence of frames and applies the simultaneous real-time classification model to predict the action of each object in each frame of the scene.

In an embodiment, the intent and interaction identifier (160d) identifies the intent of each object from the plurality of objects in the scene based on one of the classified posture and the classified action. Further, the intent and interaction identifier (160d) identifies the interaction of each object from the plurality of objects in the scene. Further, the intent and interaction identifier (160d) calculates probability between each object of the plurality of the objects in the scene based on the classified posture and the classified action. Further, the intent and interaction identifier (160*d*) identifies the intent and the interaction of each object of the plurality of objects based on the calculated probability, the determined linear motion, and the determined rotational motion.

In an embodiment, the AR content generator (160*e*) generates the AR content for the object in the scene based on the identified intent and the identified interaction of the object. Further, the AR content generator (160*e*) aggregates the identified intent and the identified interaction of the object from the plurality of objects in the scene over the pre-defined time using the ML model (160*f*). Further, the AR content generator (160*e*) maps the aggregated intent and the aggregated interaction with the predefined template of the one of the AR text templates and the AR effect templates. Further, the AR content generator (160*e*) automatically inserts the real-time information in the predefined template and displaying the predefined template with the one of the AR text templates and the AR effect templates in the scene displayed on the field of view of the electronic device (100).

At least one of the plurality of modules/components may be implemented through an AI model. A function associated with the AI model may be performed through memory (110) and the processor (120). The one or a plurality of processors controls the processing of the input data in accordance with a predefined operating rule or the AI model stored in the non-volatile memory and the volatile memory. The pre-defined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 2 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the disclosure. One or more components can be combined together to perform same or substantially similar function to generate the AR content.

Figure 3:
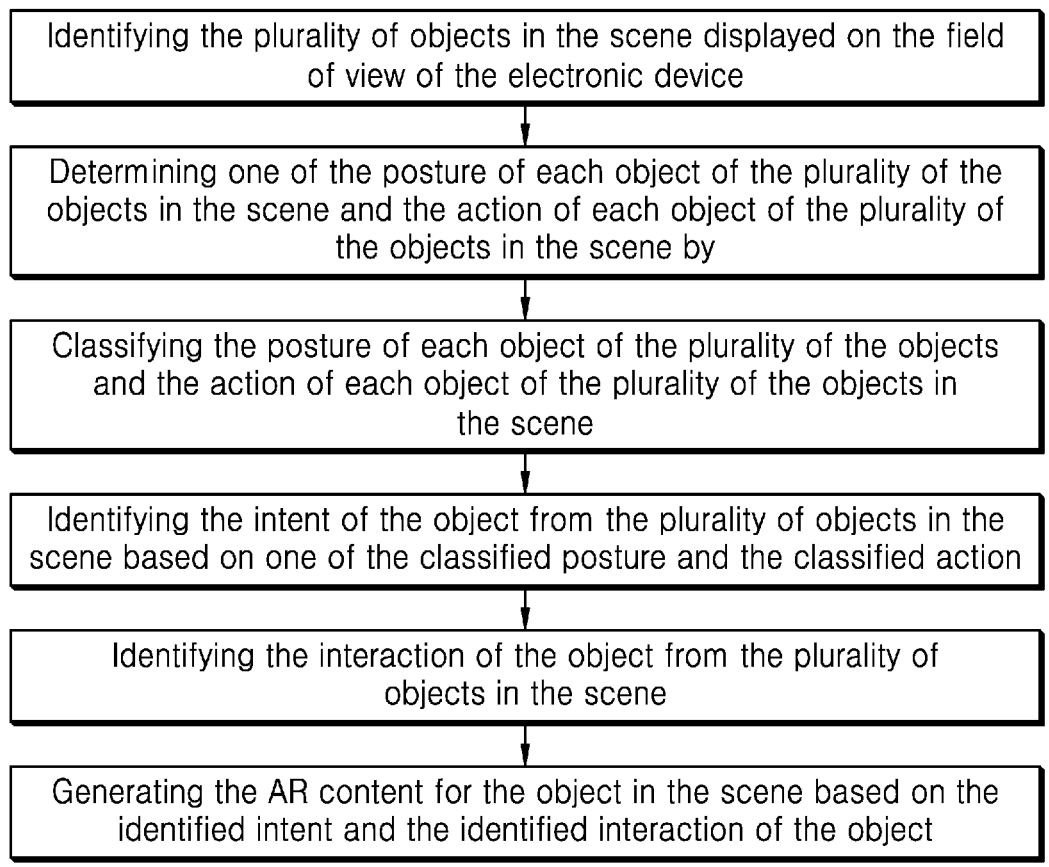
FIG. 3 is a flow diagram illustrating a method for generating an AR content by identifying interactions and intents in a multi-object environment according to an embodiment of the disclosure.

FIG. 3 is a flow diagram (300) illustrating a method for generating an AR content by identifying interactions and intents in a multi-object environment according to an embodiment of the disclosure. The operations (302-312) are performed by the electronic device (100).

Referring to FIG. 3, at 302, the method includes identifying the plurality of objects in the scene displayed on the field of view of the electronic device (100). At 304, the method includes determining one of the posture of each object of the plurality of the objects in the scene and the action of each object of the plurality of the objects in the scene by detecting multiple body key-points associated with the interacting human of the plurality of the objects and the non-interacting humans of the plurality of the objects in the scene displayed on the field of view of the electronic device (100). At 306, the method includes classifying the posture of each object of the plurality of the objects in the scene and the action of each object of the plurality of the objects in the scene. At 308, the method includes identifying the intent of the object from the plurality of objects in the scene based on one of the classified posture and the classified action. At 310, the method includes identifying the interaction of the object from the plurality of objects in the scene. At 312, the method includes generating the AR content for the object in the scene based on the identified intent and the identified interaction of the at least one object.

The various actions, acts, blocks, operations, or the like in the flow diagram (300) may be performed in the order presented, in a different order or simultaneously. Further, in some embodiments, some of the actions, acts, blocks, operations, or the like may be omitted, added, modified, skipped, or the like without departing from the scope of the disclosure.

Figure 4:
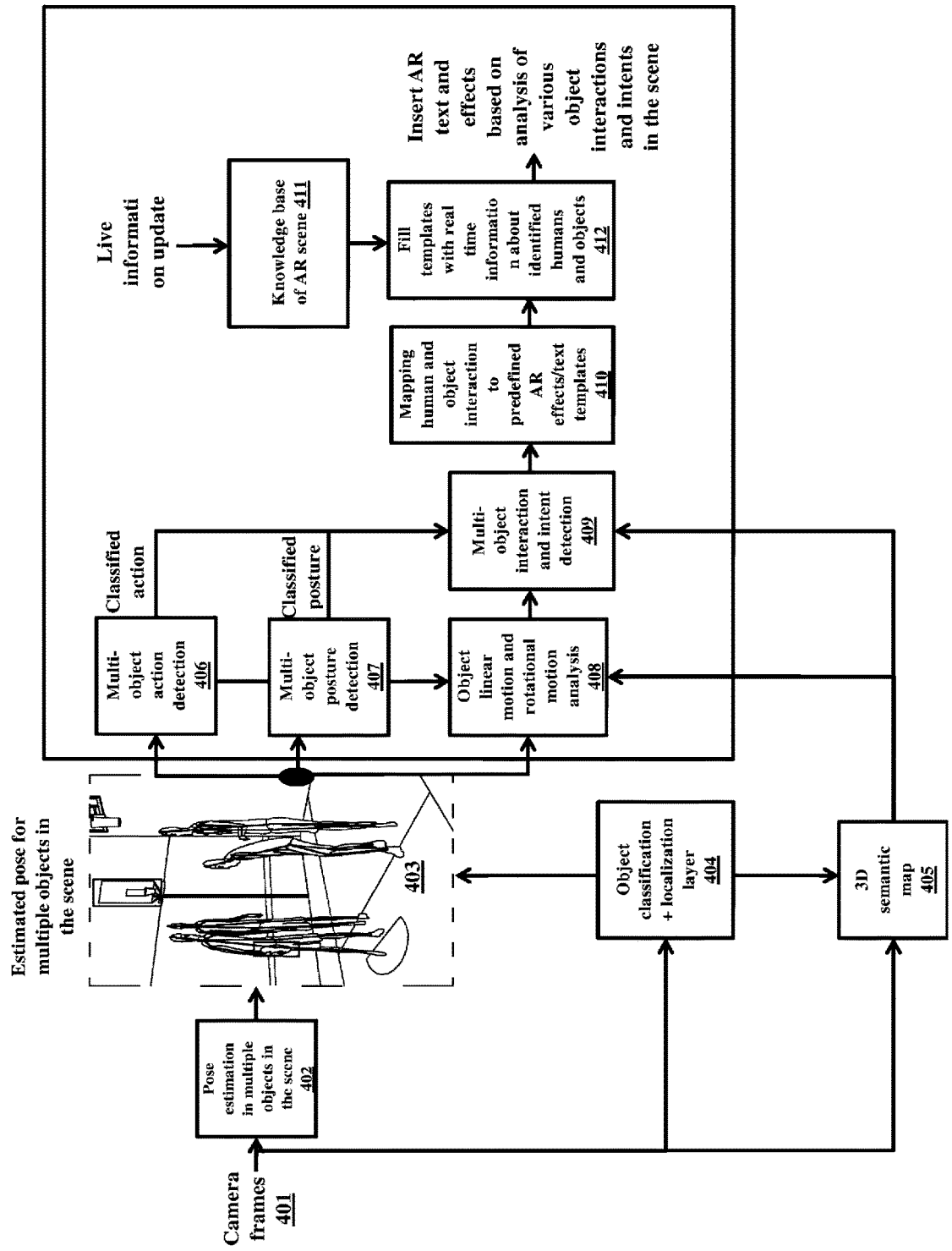
FIG. 4 is a flow diagram illustrating various operations for generating an AR content according to an embodiment of the disclosure.

FIG. 4 is a flow diagram illustrating various operations for generating an AR content according to an embodiment of the disclosure.

Referring to FIG. 4, at 401, red, green, and blue (RGB) camera image(s) (i.e., the scene displayed on the field of view of the electronic device (100)) is used as the input by the AR content controller (160) where the RGB camera image(s) includes the plurality of objects in the scene displayed on the field of view of the electronic device (100). At 402-403, the AR content controller (160) determines the posture of each object of the plurality of the objects in the scene. At 404, the AR content controller (160) determines the location information of each object of the plurality of the objects by using the bounding boxes and determines the distance information between each object of the plurality of the objects which can be used to understand the position with respect to each other. The AR content controller (160) ensures each object is classified and their positions in the scene are identified using bounding boxes by the object classification and localization.

At 405, the AR content controller (160) generates the semantic 3D map of the identified plurality of objects in the scene displayed on the field of view of the electronic device (100), which provides the location information and the distance information between objects in the scene.

At 406-407, the AR content controller (160) estimates multi-human poses by generating the skeletal joints of each human in the scene which can be used for the posture classification and the action classification. The AR content controller (160) classifies the posture of each object of the plurality of the objects in the scene (e.g., sitting, standing, arms raised, or the like) and the action of each object of the plurality of the objects in the scene (e.g., running, throwing, jumping, or the like). At 408, the AR content controller (160) determines the linear motion of each object of the plurality of the objects and the rotational motion of each object of the plurality of the objects by using the generated semantic 3D map, the classified each object, the determined location information, the classified posture, and the classified action.

At 409, the AR content controller (160) calculates the probability between each object of the plurality of the objects in the scene based on the classified posture and the classified action and identifies the intent and the interaction of each object of the plurality of objects based on the calculated probability, the determined linear motion, and the determined rotational motion.

At 410, the AR content controller (160) aggregates the identified intent and the identified interaction of the object from the plurality of objects in the scene over the pre-defined time using the ML model and maps the aggregated intent and the aggregated interaction with the predefined template of one of the AR text templates and the AR effect templates. For example, when a player scores points, there is the AR template that displays information. To indicate that a team has earned points, predefined actions, such as 1) the player throwing the ball, 2) the ball entering the backboard net. Other information required for displaying information using the AR templates, such as the player's name, squad, current score, and current points earned by the player, can be found in the AR Scene's knowledge base. At 411, the knowledge base (i.e., a memory (110)) is updated regularly with current information obtained from a variety of internal and external sources. At 412, the AR content controller (160) automatically inserts real-time information in the predefined template and displaying the predefined template with the of the AR text templates and the AR effect templates in the scene displayed on the field of view of the electronic device (100).

Figure 5:
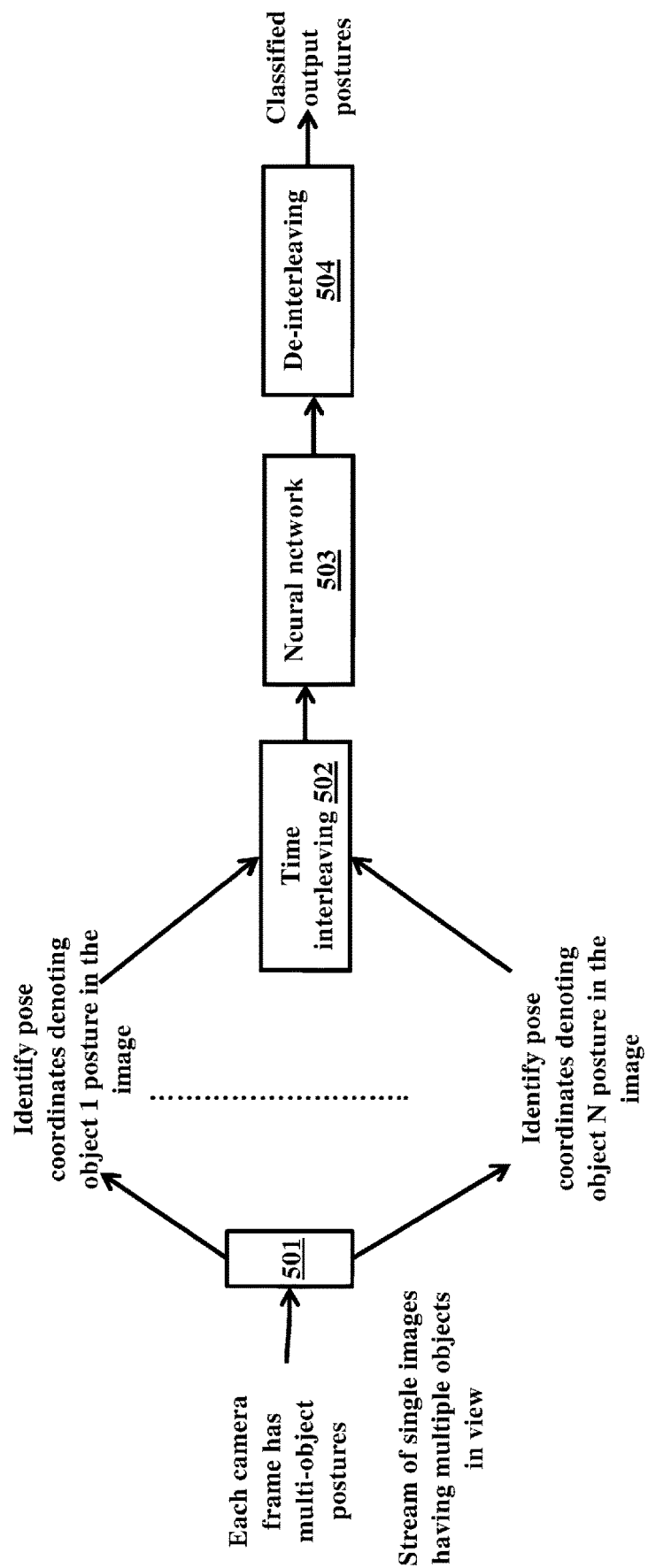
FIG. 5 is a flow diagram illustrating various operations for a posture classification of each object of a plurality of objects in a scene displayed on a field of view of an electronic device according to an embodiment of the disclosure.

FIG. 5 is a flow diagram illustrating various operations for a posture classification of each object of a plurality of objects in a scene displayed on a field of view of an electronic device according to an embodiment of the disclosure.

Referring to FIG. 5, at 501, the AR content controller (160) identifies the plurality of objects in the scene (i.e., each image frame) displayed on the field of view of the electronic device (100) and each object associated with a unique posture. The AR content controller (160) detects the pose coordinate of the identified plurality of objects in the scene and obtains the pose feature from the detected pose coordinate for each object. At 502, the AR content controller (160) performs the time interleaving operation on the detected pose coordinate and the obtained pose feature. At 503, the AR content controller (160) classifies the object postures one after another using the same posture classification model. At 504, the AR content controller (160) performs the time de-interleaving to get each object's posture prediction separately. The common posture/action model predicts each person's posture/action one after another, within a fraction of the frame duration. The postures/actions are then de-interleaved and identified for each person from the output of the model.

Figure 6:
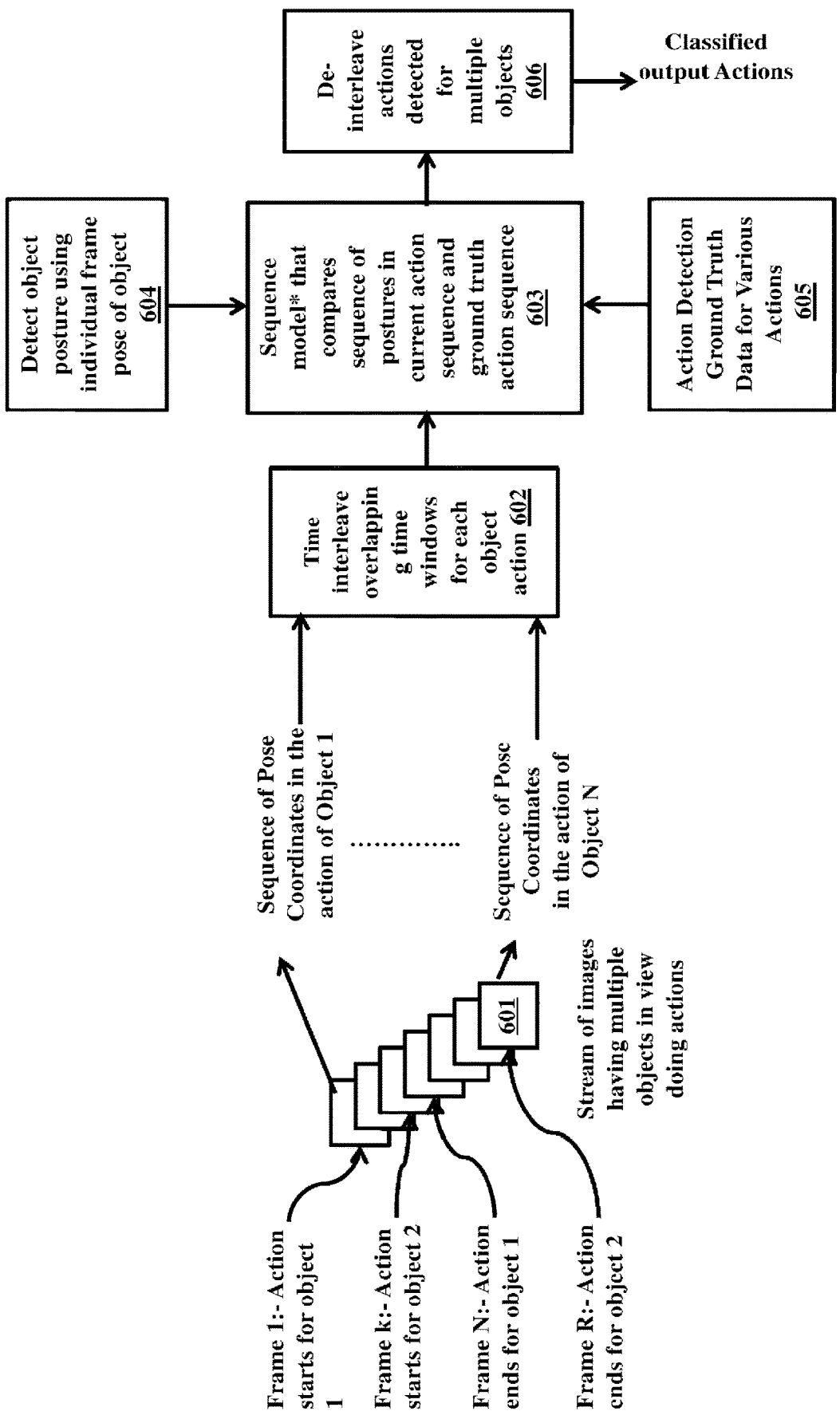
FIG. 6 is a flow diagram illustrating various operations for an action classification of each object of a plurality of objects in a scene displayed on a field of view of an electronic device according to an embodiment of the disclosure.

FIG. 6 is a flow diagram illustrating various operations for an action classification of each object of a plurality of objects in a scene displayed on a field of view of an electronic device according to an embodiment of the disclosure.

Referring to FIG. 6, at 601, the AR content controller (160) detects the sequence of the image frame, where the image frame includes the identified plurality of objects in the scene and where each object of the plurality of objects performing the action. The AR content controller (160) converts the detected sequence of image frame having actions of the first object of the plurality of objects into the sequence of pose coordinates denoting the action of the first object of the plurality of objects and converts the detected sequence of frames having actions of the second object of the plurality of objects into the sequence of pose coordinates denoting the action of the second object of the plurality of objects. At 602, the AR content controller (160) performs the time interleaving operation on each object's action.

At 603-605, the AR content controller (160) detects the posture of each object using the individual frame pose of object and detects ground truth data for various actions. The AR content controller (160) compares the sequence of postures in the current action sequence and ground truth action sequence by applying the classification model, which classifies each object's actions one after another. At 606, the AR content controller (160) performs the time de-interleaving to get each object action prediction separately.

Figure 7A:
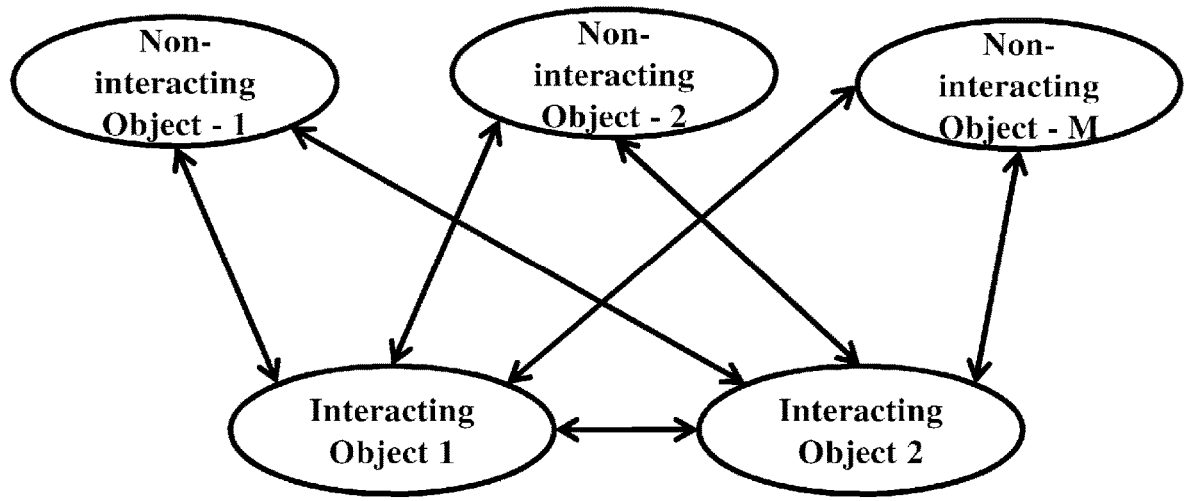
FIGS. 7A, 7B, and 7C illustrate an interaction classification and intent classification between each object of a plurality of objects in a scene displayed on a field of view of an electronic device according to various embodiments of the disclosure.
Figure 7B:
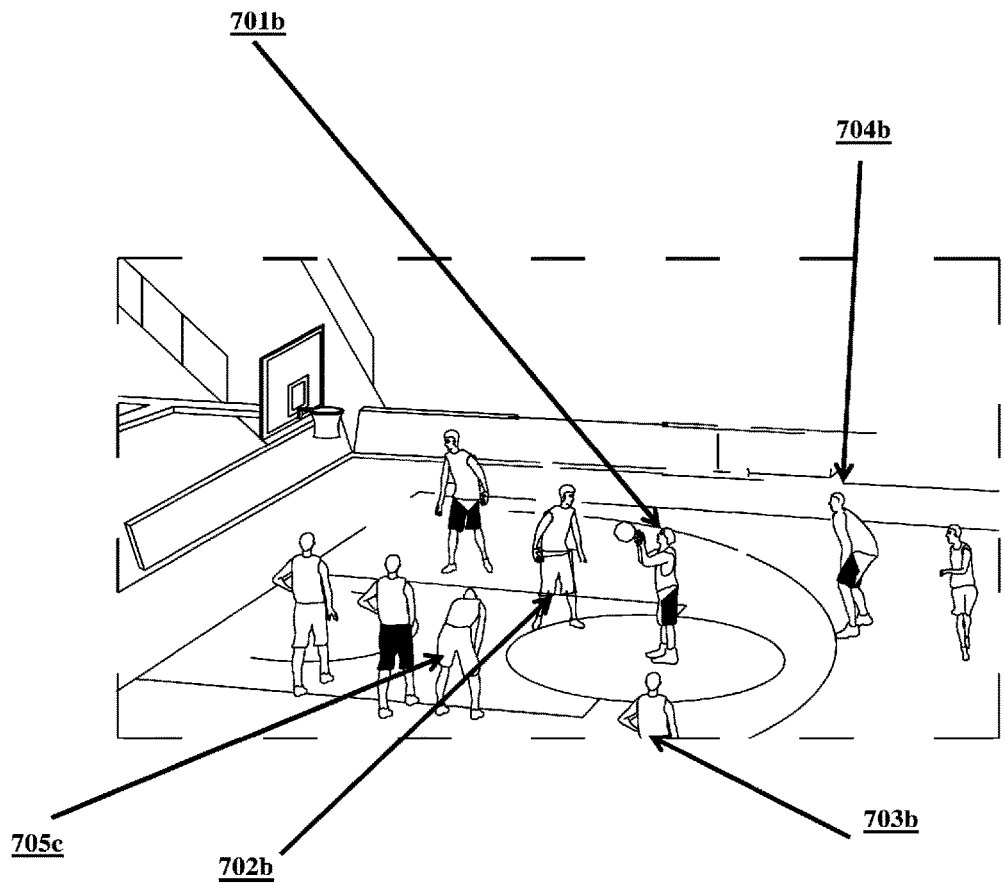
Figure 7C:
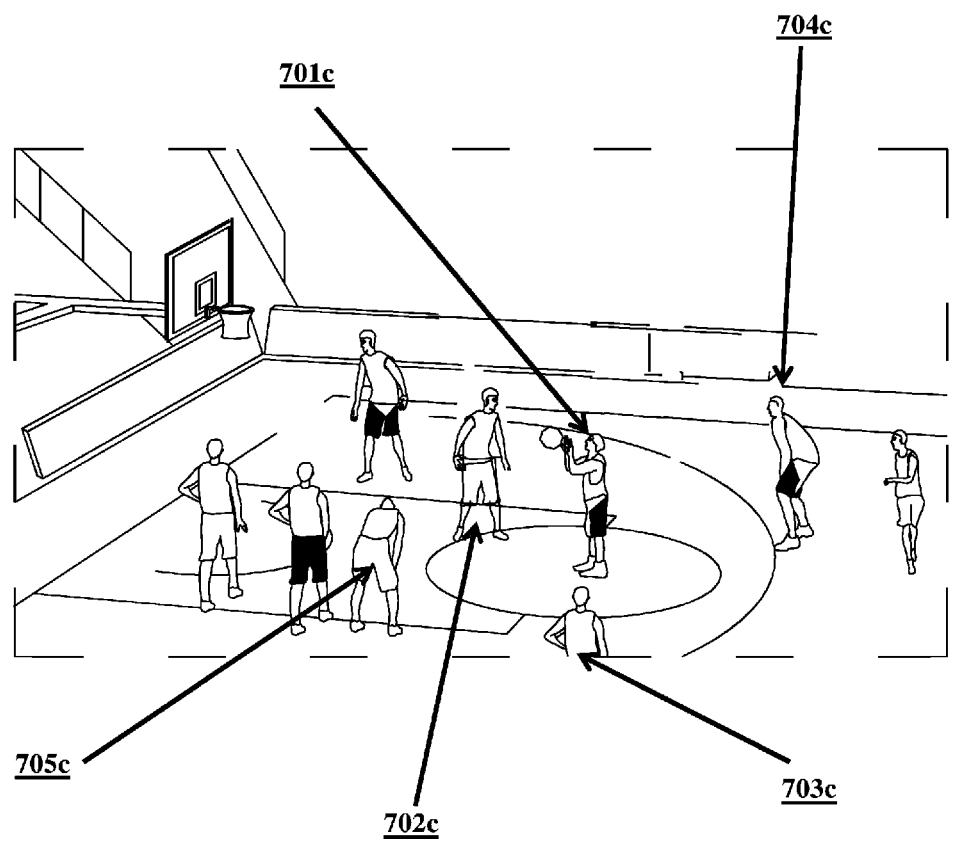

FIGS. 7A, 7B, and 7C illustrate an interaction classification and intent classification between each object of a plurality of objects in a scene displayed on a field of view of an electronic device according to various embodiments of the disclosure.

Referring to FIG. 7A, the AR content controller (160) calculates probability between each object of the plurality of the objects (e.g., interacting object-1, interacting object-2, non-interacting object-1, non-interacting object-2, non-interacting object-3, or the like) in the scene based on the classified posture and the classified action, format of the equation is shown in the equation-1. The AR content controller (160) identifies the intent and the interaction of each object of the plurality of objects based on the calculated probability, the determined linear motion, and the determined rotational motion.

$$<<\text{object-object intent,probability}>,<\text{object-object interaction,probability}>> \quad (1)$$

The intent and the interaction of each object of the plurality of objects are identified by a list of features for multi-object interaction and intent analysis, as shown in Table 1.

TABLE 1

| | |
|---|---|
| Object ID | The feature is predefined for the scene or identified using AI |
| Object function | The feature is predefined |
| Object shape | The feature is predefined or identified using AI |
| Object pose coordinates | The feature is identified using AI |
| Object postures | The feature is identified using pose coordinates and AI |
| Object actions | The feature is identified using pose coordinates and AI |
| Object linear motion coordinates | The feature is identified by tracking pose coordinates |
| Object rotational motion coordinates | The feature is identified by tracking pose coordinates |
| Object past interaction states | The feature is saved from past interactions |
| Object past intent states | The feature is saved from past intents |

The proposed method uses newly introduced "Object postures", "Object actions", "Object past interaction states", and "Object past intent states" and existing features (e.g., an Object ID, an Object function, or the like) to identify the intent and the interaction of each object of the plurality of objects.

Referring to FIG. 7B, a situation in which two basketball teams compete may be considered, where team one's dress code being "black-white" and team two's dress code being "white." The AR content controller (160) calculates probability between each object of the plurality of the objects (e.g., Basket-ball, players of team-1, players of team-2) in the scene based on the classified posture and the classified action and identifies interaction of each object of the plurality of objects based on the calculated probability, the determined linear motion, and the determined rotational motion. Where "IO" represents "Interacting objects (e.g., IO-1 is human standing with a Basket-ball, IO-2 is the Basket-ball)" and "NO" represents "Non-interacting objects (e.g., other humans without ball (NO-1, NO-2, NO-3, or the like), backboard)".

For example, at 701*b*, interaction between (IO-1, IO-2) is given by <interaction="IO-1 standing with IO-2", probability=0.91>. At 702*b*, interaction between (NO-1, IO-1) is given by <interaction="NO-1 blocks IO-1", probability=0.99> and interaction between (NO-1, IO-2) is given by <interaction="None", probability=0.97>. At 703*b*, interaction between (NO-5, IO-1) is given by <interaction="NO-5 talking to IO-1", probability=0.92> and interaction between (NO-5, IO-2) is given by <interaction="None", probability=0.97>. At 704*b*, interaction between (NO-6, IO1) is given by <interaction="none", probability=0.95> and interaction between (NO-6, IO2) is given by <interaction="none", probability=0.95>. At 705*b*, interaction between (NO-2,IO-1) is given by <interaction="NO-2 blocks IO-1", probability=0.91> and interaction between (NO-2,IO-2) is given by <interaction="None", probability=0.93>.

Referring to FIG. 7C, the same situation, as mentioned in FIG. 7B may be considered, in which two basketball teams compete, where team one's dress code being "black-white" and team two's dress code being "white." The AR content controller (160) calculates probability between each object of the plurality of objects in the scene based on the classified posture and the classified action and identifies intents of each object of the plurality of objects based on the calculated probability, the determined linear motion, and the determined rotational motion.

For example, at 701*c*, intent between (IO-1, IO-2)=<intent="IO-1 is for IO-2", probability=0.91>, intent between (NO-2, IO-1)=<intent="NO-2 is against IO-1", probability=0.94>. At 702*c*, intent between (NO-1, IO-1) <intent="NO-1 is against IO-1", probability=0.99> intent between (NO-1, IO-2)<intent="NO-2 is for IO-2", probability=0.97>. At 703*c*, intent between (NO-2, IO-1) <intent="NO-2 is for IO-1", probability=0.91> and intent between (NO-2, IO-2)<intent="NO-2 is for IO-2", probability=0.93>. At 704*c*, intent between (NO-6, IO-1) <intent="NO-6 is for IO-1", probability=0.95> and intent between (NO-6, IO2)<intent="NO-6 is for IO-2", probability=0.95>. At 705*c*, intent between (NO-5, IO-1) <intent="NO-5 is against IO-1", probability=0.92> and intent between (NO-5, IO-2)<intent="NO-5 is against IO-2", probability=0.97>.

Figure 8:
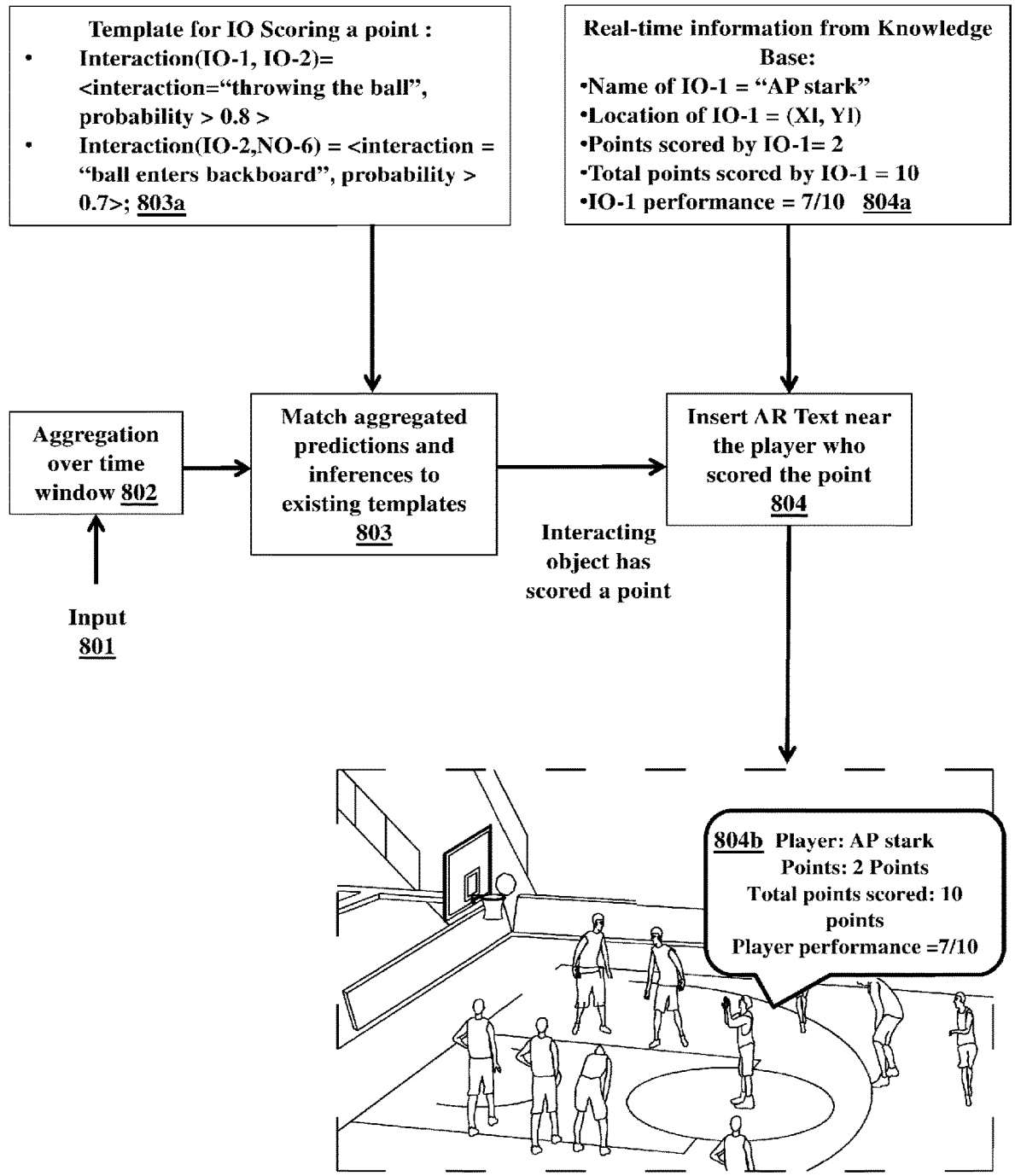
FIG. 8 is a flow diagram illustrating various operations for generating an AR content for an object in a scene according to an embodiment of the disclosure.

FIG. 8 is a flow diagram illustrating various operations for generating an AR content for an object in a scene according to an embodiment of the disclosure.

Referring to FIG. 8, at 801, the AR content controller (160) receives a plurality of inputs. Example of the plurality of inputs are object-object interactions as explained in FIG. 7B, object-object intents as explained in FIG. 7C, previous frames(s) object-object interactions, previous frames(s) object-object intents and other features as mentioned in Table 1. At 802, the AR content controller (160) aggregates the identified intent and the identified interaction of the object from the plurality of objects in the scene over the pre-defined time (e.g., tracking window of past 'w' video frames) using the ML model. At 803, the AR content controller (160) maps the aggregated intent and the aggregated interaction with the predefined template of one of the AR text templates (e.g., template for IO scoring point (803*a*)). At 804, the AR content controller (160) automatically inserts real-time information (804*a*) in the predefined template and displaying (804*b*) the predefined template with the AR text templates in the scene displayed on the field of view of the electronic device (100).

Figure 9A:
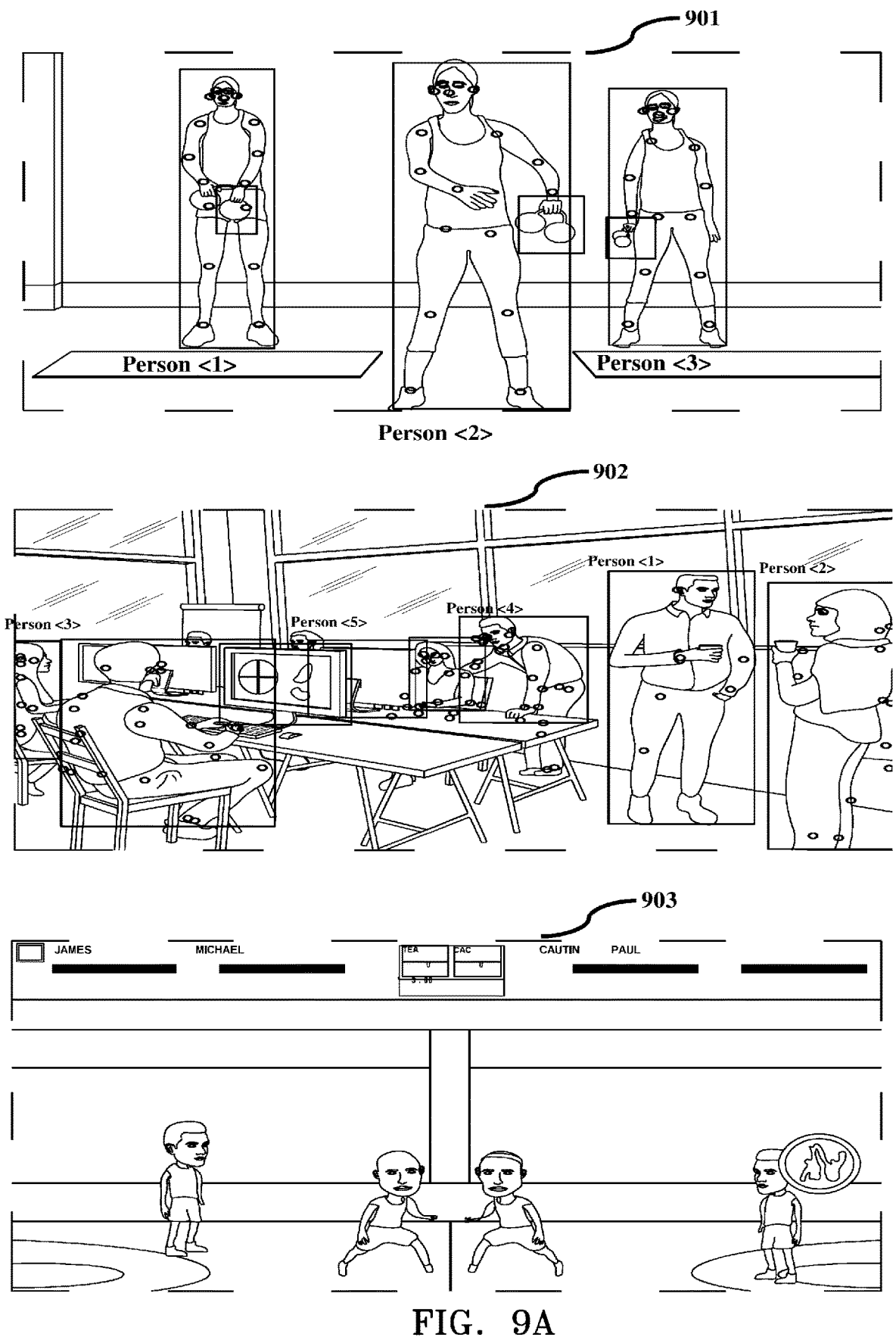
FIGS. 9A and 9B illustrate various features for generating an AR content for an object in a scene according to various embodiments of the disclosure.
Figure 9B:
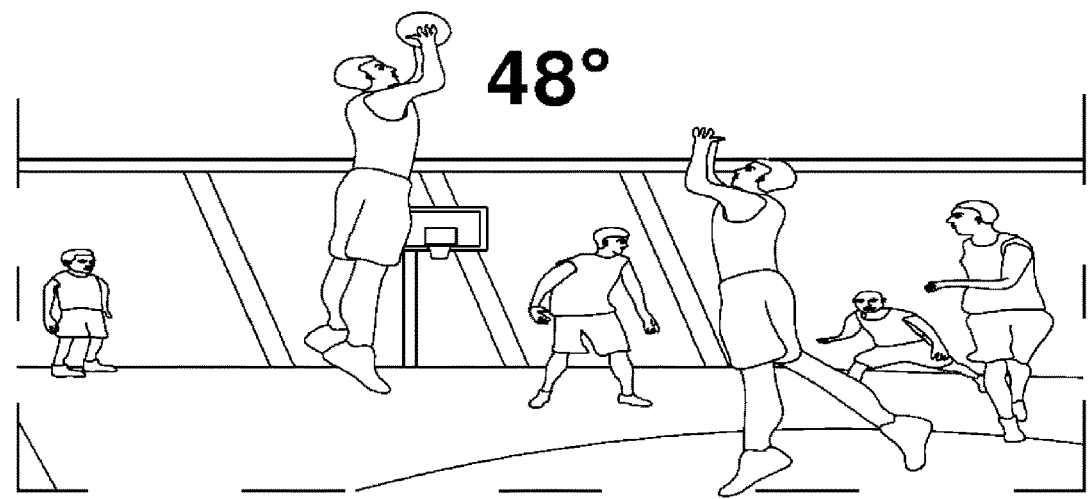
Figure 9B:
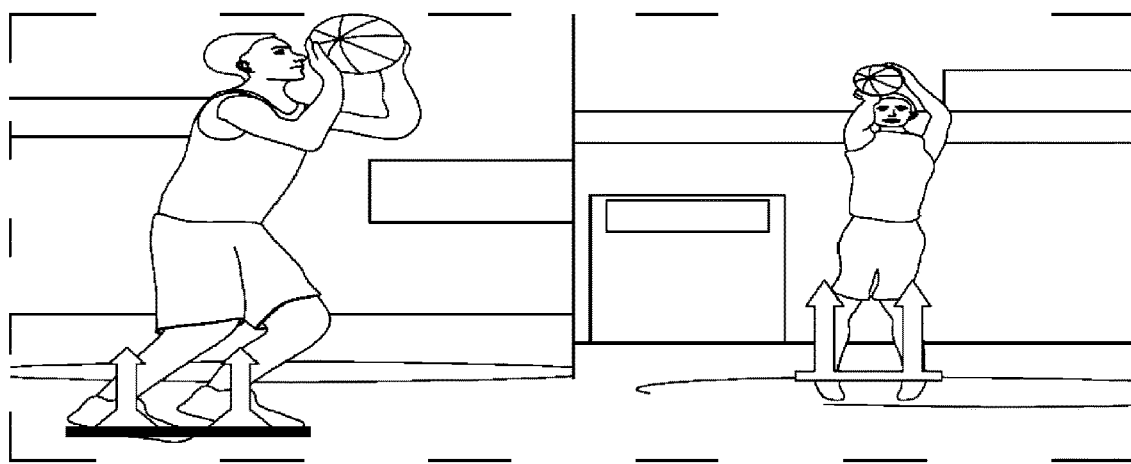
Figure 9B:
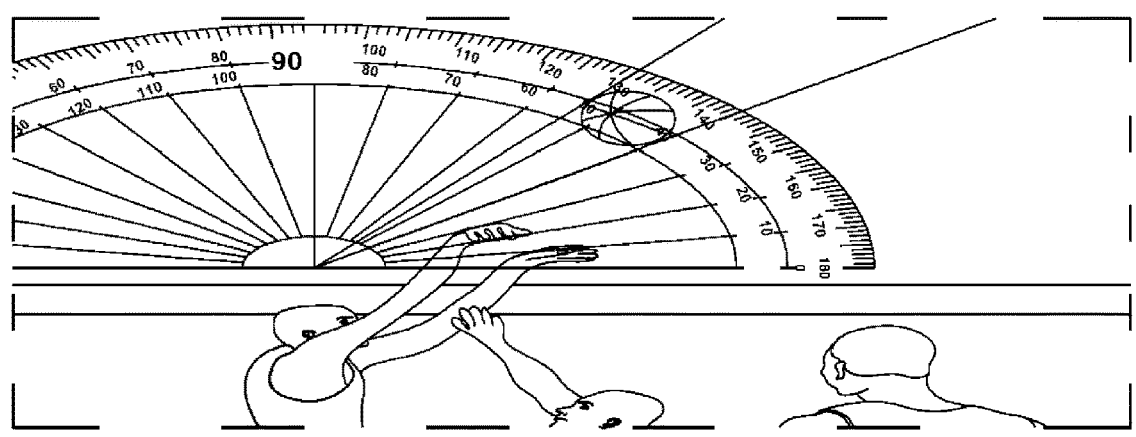

FIGS. 9A and 9B illustrate various features for generating the AR content for the object in the scene, according to various embodiments of the disclosure.

Referring to FIG. 9A, at 901, illustrates an example scenario relating to a multi-user fitness program, the AR content controller (160) compares fitness object interactions between multiple users (e.g., person <1>, person <2>, and person <3>) in the scene displayed on the field of view of the electronic device (100). Furthermore, the AR content controller (160) allocates a rank and a score to various users performing workout exercises based on the correctness of a routine, and gives feedback to individual users performing exercises based on incorrect postures when engaging with objects. For example, the person <1> is interacting with dumbbell correctly and action synchronized with the person <2>, the person <3> action has to be corrected while interacting with dumbbell. The person <3> action not synchronized with the person<1> and the person<2>.

At 902, illustrates an example scenario relating to object specific relationship analysis through the intents and the interactions, the AR content controller (160) detects the actions and the postures of all objects in the scene displayed on the field of view of the electronic device (100). Then, the AR content controller (160) detects the intents and the interactions between the objects in the scene displayed on the field of view of the electronic device (100), and provides camera functionality a deeper, object level context through our proposed method. For example, the person <1> is holding a cup and talking to the person<2>, the person <2> is holding a cup and talking to person<1>, the person <3> is working on computer, the person <4> is bending and talking to the person <5> who is sitting behind computer.

At 903, illustrates an example in which the AR content controller (160) inserts AR Emojis and effects on real humans based on action tracking and gesture recognition in the scene displayed on the field of view of the electronic device (100).

Referring to FIG. 9B, at 904, illustrates an example in which the AR content controller (160) inserts the AR Text based on the detected posture/action of the human in the scene displayed on the field of view of the electronic device (100). At 905, illustrates an example in which the AR content controller (160) inserts the AR text graphics based on the detected posture/action of the human in the scene displayed on the field of view of the electronic device (100). At 906, illustrates an example in which the AR content controller (160) inserts the AR effects based on the detected posture/action of the human in the scene displayed on the field of view of the electronic device (100).

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method for generating augmented reality (AR) content in an electronic device, the method comprising:
   identifying, by the electronic device, a plurality of objects in a scene displayed on a field of view of the electronic device;
   determining, by the electronic device, at least one of a posture of each object of the plurality of the objects in the scene and an action of each object of the plurality of the objects in the scene;
   classifying, by the electronic device, the posture of each object of the plurality of the objects in the scene and the action of each object of the plurality of the objects in the scene;
   identifying, by the electronic device, an intent of at least one object from the plurality of objects in the scene based on at least one of the classified posture or the classified action;
   identifying, by the electronic device, an interaction between the at least one object and at least one second object from the plurality of objects in the scene; and
   generating, by the electronic device, the AR content for the at least one object in the scene of at least one of the identified intent or the identified interaction between the at least one object and the at least one second object from the plurality of objects in the scene.

2. The method of claim 1, further comprising:
   classifying, by the electronic device, each object of the plurality of the objects in order to determine the posture, the action, the interaction and the intent associated with each object of the plurality of the objects in the scene;
   generating, by the electronic device, a semantic two-dimensional (2D) map of the identified plurality of objects in the scene displayed on the field of view of the electronic device;
   generating, by the electronic device, a semantic three-dimensional (3D) map of the identified plurality of objects in the scene displayed on the field of view of the electronic device;
   determining, by the electronic device, location information of each object of the plurality of the objects by using bounding boxes and distance information between each object of the plurality of the objects by using the semantic 3D map and the semantic 2D map; and
   determining, by the electronic device, a linear motion of each object of the plurality of the objects and a rotational motion of each object of the plurality of the objects by using the generated semantic 3D map, the classified each object, the determined location information, the classified posture, and the classified action.

3. The method of claim 1, further comprising:
   detecting, by the electronic device, multiple body key-points associated with an interacting human of the plurality of the objects and non-interacting humans of the plurality of the objects in the scene displayed on the field of view of the electronic device; and
   estimating, by the electronic device, the posture of each object of the plurality of the objects based on features derived from the detected multiple body key-points to classify the posture of each object of the plurality of the objects in the scene.

4. The method of claim 1, further comprising:
   classifying, by the electronic device, the action of each object of the plurality of the objects based on the classified postures and multiple body key-points identified over a current frame and multiple past frames.

5. The method of claim 1, further comprising:
   detecting, by the electronic device, at least one pose coordinate of the identified plurality of objects in the scene;
   obtaining, by the electronic device, at least one pose feature from the detected at least one pose coordinate;
   time interleaving, by the electronic device, pose features obtained from multiple objects in a single camera frame, and providing each object pose feature as input to a simultaneous real-time classification model to predict the posture of all objects in the single camera frame before next camera frame arrives; and
   applying, by the electronic device, the simultaneous real-time classification model to predict the posture of each object in each frame of the scene.

6. The method of claim 1, further comprising:
   detecting, by the electronic device, sequence of an image frame, wherein the image frame comprises the identified plurality of objects in the scene and wherein each object of the plurality of objects performing the action;
   converting, by the electronic device, the detected sequence of image frame having actions of at least one first object of the plurality of objects into a sequence of pose coordinates denoting the action of at least one first object of the plurality of objects;
   converting, by the electronic device, the detected sequence of frames having actions of at least one-second object of the plurality of objects into the sequence of pose coordinates denoting the action of the at least one-second object of the plurality of objects;
   time interleaving, by the electronic device, the pose features and classified postures, obtained from the plurality of objects over current multiple camera frames, and providing each object pose features and classified postures as input to a simultaneous real-time classification model to predict the action of all objects in the current multiple camera frames before the next camera frame arrives; and
   applying, by the electronic device, the simultaneous real-time classification model to predict the action of each object in each frame of the scene.

7. The method of claim 1, further comprising:
   calculating, by the electronic device, probability of the intent and the interaction of each object of the plurality of the objects in the scene based on the classified posture and the classified action; and
   identifying, by the electronic device, the intent and the interaction of each object of the plurality of objects based on the calculated probability, a determined linear motion of the at least one object, and a determined rotational motion of the at least one object.

8. The method of claim 7,
   wherein the intent and the interaction of each object of the plurality of objects is identified by using a plurality of features, and wherein the plurality of features comprises an object Identity (ID), object function, object shape, object pose coordinates, object postures, object actions, object linear motion coordinates, object rotational motion coordinates, object past interaction states, and object past intent states.

9. The method of claim 1, wherein the generating of the AR content for the at least one object in the scene of at least one of the identified intent or the identified interaction of the at least one object comprising:
aggregating, by the electronic device, the identified intent and the identified interaction of the at least one object from the plurality of objects in the scene over a pre-defined time using a machine learning (ML) model;
mapping, by the electronic device, the aggregated intent and the aggregated interaction with at least one pre-defined template of at least one of an AR text templates or an AR effect templates; and
automatically inserting, by the electronic device, real-time information in the at least one predefined template and displaying the at least one predefined template with the at least one of the AR text templates or the AR effect templates in the scene displayed on the field of view of the electronic device.

10. The method of claim 9, wherein the inserting of the real-time information in the at least one of the AR text template or the AR effect template uses the real-time information from a knowledge base.

11. An electronic device for generating augmented reality (AR) content in the electronic device, the electronic device comprising:
a memory;
a processor; and
an AR content controller, operably connected to the memory and the processor, configured to:
identify a plurality of objects in a scene displayed on a field of view of the electronic device,
determine at least one of a posture of each object of the plurality of the objects in the scene and an action of each object of the plurality of the objects in the scene,
classify the posture of each object of the plurality of the objects in the scene and the action of each object of the plurality of the objects in the scene,
identify an intent of at least one object from the plurality of objects in the scene based on at least one of the classified posture or the classified action,
identify an interaction between the at least one object and at least one second object from the plurality of objects in the scene, and
generate the AR content for the at least one object in the scene of at least one of the identified intent or the identified interaction between the at least one object and the at least one second object from the plurality of objects in the scene.

12. The electronic device of claim 11, further comprising:
classifying, by the electronic device, each object of the plurality of the objects in order to determine the posture, the action, the interaction and the intent associated with each object of the plurality of the objects in the scene;
generating, by the electronic device, a semantic two-dimensional (2D) map of the identified plurality of objects in the scene displayed on the field of view of the electronic device;
generating, by the electronic device, a semantic three-dimensional (3D) map of the identified plurality of objects in the scene displayed on the field of view of the electronic device;
determining, by the electronic device, location information of each object of the plurality of the objects by using bounding boxes and distance information between each object of the plurality of the objects by using the semantic 3D map and the semantic 2D map; and
determining, by the electronic device, a linear motion of each object of the plurality of the objects and a rotational motion of each object of the plurality of the objects by using the generated semantic 3D map, the classified each object, the determined location information, the classified posture, and the classified action.

13. The electronic device of claim 11, wherein the AR content controller is further configured to:
detect multiple body key-points associated with an interacting human of the plurality of the objects and non-interacting humans of the plurality of the objects in the scene displayed on the field of view of the electronic device, and
estimate the posture of each object of the plurality of the objects based on features derived from the detected multiple body key-points to classify the posture of each object of the plurality of the objects in the scene.

14. The electronic device of claim 11, wherein the AR content controller is further configured to:
classify the action of each object of the plurality of the objects based on the classified postures and multiple body key-points identified over a current frame and multiple past frames.

15. The electronic device as claimed in claim 11, wherein classify the posture of each object of the plurality of the objects in the scene comprises the AR content controller is further configured to:
detect at least one pose coordinate of the identified plurality of objects in the scene,
obtain at least one pose feature from the detected at least one pose coordinate,
time interleaving pose features obtained from multiple objects in a single camera frame, and providing each object pose feature as input to a simultaneous real-time classification model to predict the posture of all objects in the single camera frame before next camera frame arrives, and
apply a simultaneous real-time classification model to predict the posture of each object in each frame of the scene.

16. The electronic device as claimed in claim 11, wherein classify the action of each object of the plurality of the objects in the scene comprises the AR content controller is further configured to:
detect sequence of an image frame, wherein the image frame comprises the identified plurality of objects in the scene and wherein each object of the plurality of objects performing the action,
convert the detected sequence of image frame having actions of at least one first object of the plurality of objects into a sequence of pose coordinates denoting the action of at least one first object of the plurality of objects,
convert the detected sequence of frames having actions of at least one-second object of the plurality of objects into the sequence of pose coordinates denoting the action of the at least one-second object of the plurality of objects, time interleaving the pose features and classified postures, obtained from the plurality of objects over current multiple camera frames, and providing each object pose features and classified postures as input to a simultaneous real-time classification model to predict the action of all objects in the current multiple camera frames before the next camera frame arrives, and apply the simultaneous real-time classification model to predict the action of each object in each frame of the scene.

17. The electronic device as claimed in claim 11, wherein identifying the intent and the interaction of each object of the plurality of objects in the scene comprises the AR content controller is further configured to:

calculate probability of the intent and the interaction of each object of the plurality of the objects in the scene based on the classified posture and the classified action, and identify the intent and the interaction of each object of the plurality of objects based on the calculated probability, a determined linear motion of the at least one object, and a determined rotational motion of the at least one object.

18. The electronic device as claimed in claim 17, wherein the intent and the interaction of each object of the plurality of objects is identified by using a plurality of features, and wherein the plurality of features comprises an object Identity (ID), object function, object shape, object pose coordinates, object postures, object actions, object linear motion coordinates, object rotational motion coordinates, object past interaction states, and object past intent states.

19. The electronic device as claimed in claim 11, wherein generate the AR content for the at least one object in the scene of at least one of the identified intent and the identified interaction of the at least one object comprises the AR content controller is further configured to:

aggregate the identified intent and the identified interaction of the at least one object from the plurality of objects in the scene over a pre-defined time using a machine learning (ML) model, map the aggregated intent and the aggregated interaction with at least one predefined template of at least one of an AR text templates and or an AR effect templates, and automatically insert real-time information in the at least one predefined template and displaying the at least one predefined template with the at least one of the AR text templates and or the AR effect templates in the scene displayed on the field of view of the electronic device.

20. At least one non-transitory computer readable storage medium configured to store one or more computer programs including instructions that, when executed by at least one processor of an electronic device, cause the at least one processor to:

identify, by the electronic device, a plurality of objects in a scene displayed on a field of view of the electronic device;

determine, by the electronic device, at least one of a posture of each object of the plurality of the objects in the scene and an action of each object of the plurality of the objects in the scene;

classify, by the electronic device, the posture of each object of the plurality of the objects in the scene and the action of each object of the plurality of the objects in the scene;

identify, by the electronic device, an intent of at least one object from the plurality of objects in the scene based on at least one of the classified posture or the classified action;

identify, by the electronic device, an interaction between the at least one object and at least one second object from the plurality of objects in the scene; and generate, by the electronic device, augmented reality (AR) content for the at least one object in the scene of at least one of the identified intent or the identified interaction between the at least one object and the at least one second object from the plurality of objects in the scene.

* * * * *